No. 864,409. PATENTED AUG. 27, 1907.
E. J. EDWARDS.
ROLLER BEARING.
APPLICATION FILED OCT. 24, 1906.
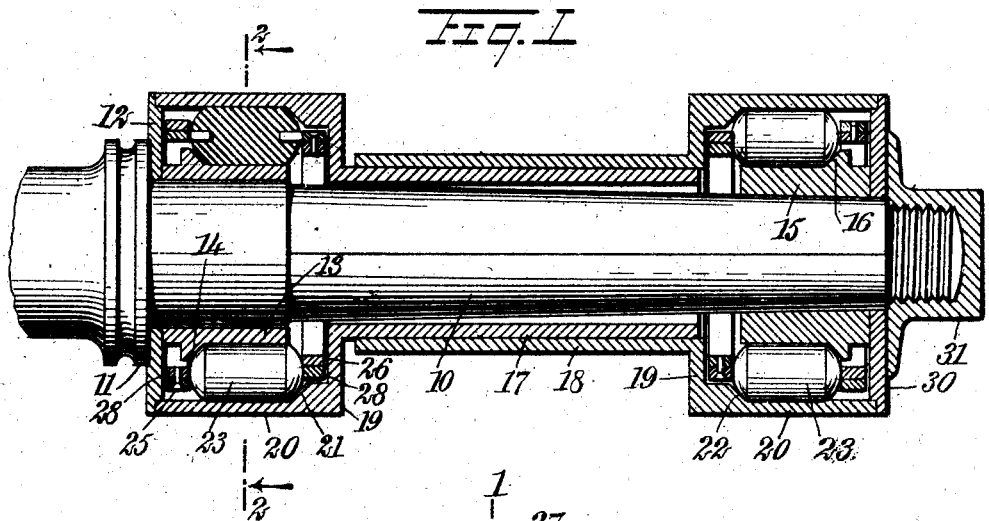
Fig. 1
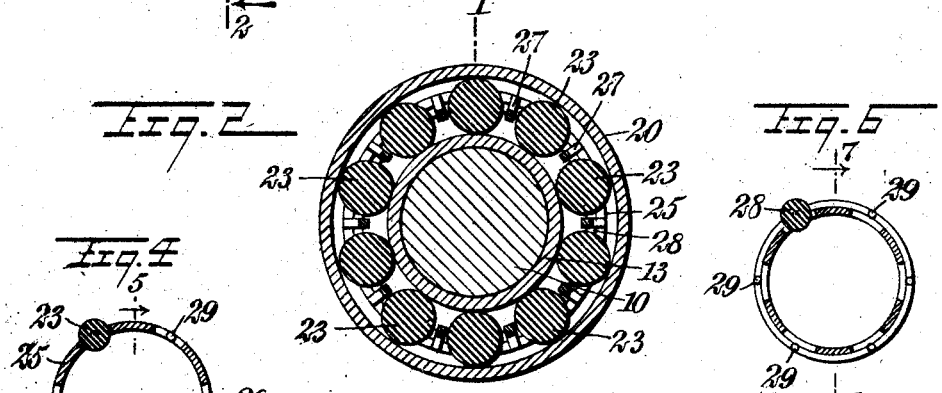
Fig. 2
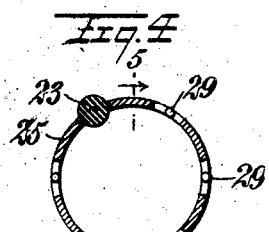
Fig. 4
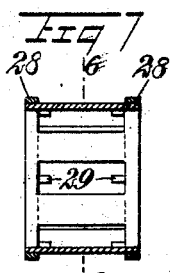
Fig. 6
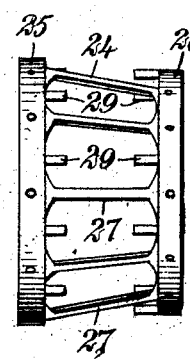
Fig. 5
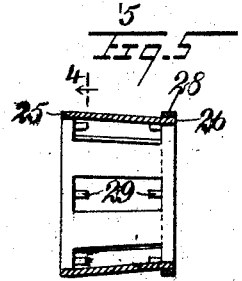
Fig. 3
Fig. 7
WITNESSES
H. Walker
C. W. Fairban
INVENTOR
Ellsworth J. Edwards
BY Munn & Co
ATTORNEYS

UNITED STATES PATENT OFFICE.

ELLSWORTH J. EDWARDS, OF LOS ANGELES, CALIFORNIA.

ROLLER-BEARING.

No. 864,409.	Specification of Letters Patent.	Patented Aug. 27, 1907.

Application filed October 24, 1906. Serial No. 340,305.

*To all whom it may concern:*

Be it known that I, ELLSWORTH J. EDWARDS, a citizen of the United States, and a resident of Los Angeles, in the county of Los Angeles and State of California, have invented a new and Improved Roller-Bearing, of which the following is a full, clear, and exact description.

This invention relates to certain improvements in roller bearings and more particularly to the means for supporting the rollers within the bearing and keeping them in alinement at all times.

The object of the invention is to provide a supporting means for the rollers whereby the contact of the ends of the roller with the shoulders of the bearing surfaces may be free and unrestricted, the frame being so constructed that it occupies a position adjacent the bearing surface but on the opposite side of the center of the roller.

In the manufacture of roller bearings the great difficulty which manufacturers have been unable to successfully overcome has been the producing of a bearing which would carry the weight with a rolling motion and carry the end thrust when on an incline with the same set of rollers and yet provide a means for separating and for guiding the rollers parallel with the journal. Various different frames and racks for carrying the rollers have been constructed or suggested, but all have been open to serious objection. Flat washers at each end of the rollers forming journal boxes, have been employed, and these washers have been rigidly joined together by a series of connecting rods. To make this frame sufficiently rigid it has been necessary to make the washers so wide that it left very little space between the washer and the boxing and bushing. To overcome this, tapered rollers, collars and boxes have been employed, the rollers being provided with grooves and the collars provided with shoulders. In this construction when carrying a heavy end thrust, the boxes wedge the rollers and prevent their rolling. The wedge shape of the rollers constantly tends to force them out from between the boxing and collars, resulting in quickly wearing away the shoulders. Others have used parallel rollers and formed collars and grooves intermediate the ends of the rollers, making it necessary to use two or three-piece boxings or bushings. Others have formed vertical collars at the outer ends of the rollers and vertical shoulders on the bushings, doing away with the frame for carrying the rollers and using grooves as guides. The vertical collars bind the ends of the rollers and retard their movement, the collars wear away, and the rollers do not lie parallel to the journal. As yet, no means has been provided for completely overcoming this difficulty.

I have found that a frame sufficiently rigid can be constructed of a tube with thin walls through which the rollers are set, and the journals could be formed on annuli telescoping the ends of the tube and leaving sufficient space at the ends of the rollers for carrying end thrust. I have also found that the binding of the vertical rollers and shoulders, or of beveled rollers and corresponding beveled collars, could be avoided by using rollers with round ends in connection with collars with beveled shoulders, and that these shoulders could be formed sufficiently wide to carry end thrust without contacting with the frames which carry the rollers, and that the rollers could be advanced by the use of washers at their outer ends to take up wear.

In my improved construction hereinafter described, I employ plain rollers with round ends, a horizontal boxing having a beveled shoulder but without grooves or collars, a horizontal bushing without grooves or intermediate collars, and a beveled collar at the end of the rollers. The frame which supports and carries the rollers lies on the opposite side of the roller from said beveled collar and beveled shoulder.

Reference is to be had to the accompanying drawing forming a part of this specification, in which similar characters of reference indicate corresponding parts in all the figures, in which Figure 1 is a central longitudinal section illustrating one embodiment of my improved roller bearings; Fig. 2 is a transverse section on the line 2—2 of Fig. 1; Fig. 3 is a side elevation of the roller supporting frame illustrated in Figs. 1 and 2; Fig. 4 is a transverse section of a modified form of frame, said section being taken on the line 4—4 of Fig. 5; Fig. 5 is a longitudinal section of the frame illustrated in Fig. 4, said section being taken on the line 5—5 of Fig. 4; and Figs. 6 and 7 are views similar to Figs. 4 and 5, but showing a second modified form.

In Figs. 1 and 2 I have illustrated a device embodying my invention, there being provided a spindle 10 having a shoulder 11 integral therewith and against which rests a collar 12 forming one end of the boxing for the bearing. Adjacent this collar is a second collar 13 having a cylindrical bearing surface and an outwardly beveled shoulder 14. At the outer end of the spindle is a third collar 15 somewhat similar to the collar 13 and having a cylindrical bearing surface and an inwardly beveled shoulder 16.

Surrounding the spindle are two telescoping tubes 17 and 18, each of which terminates in a shoulder 19 connected to a boxing 20. This boxing has a cylindrical inner bearing surface, and adjacent the juncture of the boxings 20 and the shoulders 19 are located beveled shoulders 21 and 22 lying substantially parallel to the shoulders 14 and 16 of the two collars 13 and 15.

Surrounding the cylindrical bearing surfaces of the collars 13 and 15 and in engagement with the inner cylindrical bearing surface of the boxings 20, I provide a plurality of rollers 23 having cylindrical bearing surfaces and rounded or hemi-spherical ends. Each roller is provided with a journal box extending into the center of each end, and by means of these journal boxes the rollers are spaced and supported.

In the preferred form of my roller supporting frame, I employ a tube 24 having the ends thereof cylindrical and the intermediate portion conical, whereby one cylindrical end 25 is substantially larger than the opposite cylindrical end 26. The tapered or conical portion of the tube is provided with a plurality of perforations, each of which is slightly wider than the diameter of one of the rollers, and the length of these perforations, as well as the distance between the end cylindrical portions 25 and 26, is substantially equal to the length of the rollers. The larger cylindrical end portion 25 is sufficiently large to lie outside of the journal boxes at one end of the rollers, while the smaller cylindrical end portion 26 is of a diameter to lie within the row of journal boxes at the opposite end of the rollers. The strips 27 connecting the two cylindrical end portions and which lie intermediate the perforations, extend diagonally from the larger cylindrical end portion 25 to the smaller cylindrical end portion 26. Two annuli 28 of the same size and diameter are provided, and each of these has a plurality of journals 29 extending longitudinally of one edge and spaced the same distance apart as the centers of the perforations in the tube 24. These journals are adapted to fit the journal boxes in the ends of the rollers, and one of the annuli fits within the cylindrical end portion 25 of the tube and is riveted thereto, while the other annuli surrounds the smaller cylindrical end portion 26 and is riveted thereto. The journals on one annulus are in alinement with those on the other and are located adjacent the center of the perforations of the tube 24. It will thus be noted that the rollers are supported by the two annuli and the journals carried thereby, and the annuli are held rigid and in their proper position by the tube 24, one end of which is secured to the outer surface of one annulus, while the other end is secured to the inner surface of the other annulus.

As the beveled shoulder 14 on the collar 13 contacts with the end of the roller on one side of the journal boxes, while the beveled shoulder 21 on the boxing 20 contacts with the end of the roller on the opposite side of the journal boxes, and the cylindrical end portions 25 and 26 are located on the opposite sides of the journal boxes from the beveled collars, it will be noted that they are entirely free from these beveled collars, yet, at the same time, rigidly support the annuli and journals. The annuli need not be made of a thickness greater than the journals, and, therefore, the shoulders 14 and 21 may extend nearly half way across the end of the roller, in other words, up to the journal of the roller, while as the cylindrical end portions 25 and 26 of the tube 24 are on the opposite sides of the journals from the beveled shoulders, it is evident that they may be made as thick and as strong as desired without limiting the end area of the roller or sacrificing the end bearing surface.

The collar 15 having the beveled shoulder 16, is preferably longitudinally movable upon the end of the spindle 10, whereby as the ends of the rollers and the beveled shoulders wear away, the collar may be moved along the spindle a short distance and hold the parts in their proper position at all times. Any suitable packing rings, not shown, may be inserted between the end of the collar 15 and the outer end member or collar 30 which closes the boxing 20. A suitable nut 31 of any suitable character is secured to the end of the spindle for holding all of the parts in their proper relationship. The tubes 17 and 18 being free to move longitudinally in respect to each other, the improved device above described may be employed with wheels having hubs of various lengths. In the use of this device the tubes 17 and 18 would be telescoped until the shoulders 19 come into engagement with the opposite ends of the hub to firmly bind the same, and the necessary packing rings may be inserted between the nut 31 and the end portion 30 of the boxing.

In larger bearings in which the diameter of the rollers is sufficiently great to present ample end thrust, I may, if desired, employ the form of supporting frame illustrated in Figs. 4 and 5. This frame is similar to the frame above described, save that the journals 29 are formed integral with the larger cylindrical end portion 25 instead of being carried by an annulus, while the journals at the smaller end are carried by an annulus 28 as in the form above described.

In Figs. 6 and 7 the intermediate portion of the supporting frame is cylindrical rather than conical in form, and both of the annuli 28 are secured to the outer surface of the cylindrical end portions rather than one being secured to the outer surface and the other to the inner surface.

Various changes may be made in the form of the boxing, collars and shoulders, as these do not involve an essential portion of my invention. It is only essential that oppositely-disposed cylindrical bearing surfaces be provided and spaced apart a distance equal to the diameter of the rollers, and shoulders be provided on said bearing surfaces against which the ends of the rollers may contact.

Having thus described my invention, I claim as new and desire to secure by Letters Patent:

1. In combination, a plurality of rollers, two annular members, one adjacent each end of said rollers, journals carried by said members and in engagement with said rollers, and means in engagement with the outer surface of one of said members and the inner surface of the other member for spacing the members and holding them in position.

2. In combination, a plurality of rollers, an annulus having journals integral therewith and in engagement with one end of each of said rollers, a second annulus having journals integral therewith and in engagement with the opposite end of each of said rollers, and means connecting said annull and in engagement with the outer surface of one and the inner surface of the other.

3. In combination, a plurality of rollers, an annular member having journals in engagement with one end of each of said rollers, a second annular member having journals in engagement with the opposite end of each of said rollers, and means connecting said annuli and in engagement with the outer surface of one of them.

4. In combination, a plurality of rollers, an annular member having journals in engagement with one end of each of said rollers, a second annular member having journals in engagement with the opposite end of each of said rollers, and means connecting said annuli and in engagement with the inner surface of one of them.

5. In combination, a plurality of rollers, a tube having cylindrical end portions and perforations intermediate said end portions, said perforations being of a width substantially equal to the diameter of the rollers and of a length equal to the length of said rollers, annular members carried by said cylindrical portions there being journals carried by said annular members and adapted to enter journal boxes in the ends of said rollers for supporting the latter.

6. In combination, a plurality of rollers, having cylindrical bearing surfaces and rounded ends, a tube having cylindrical end portions and a conical intermediate portion, and journals carried by said cylindrical end portions for supporting the rollers.

7. In combination, a plurality of rollers, a tube having cylindrical end portions of different diameter and a conical intermediate portion provided with perforations through which said rollers extend, and journals supported adjacent the cylindrical end portions for coacting with the rollers to support the latter.

8. In combination, a plurality of rollers, a tube having cylindrical end portions and a conical intermediate portion provided with perforations through which said rollers extend, and an annulus secured to one of said cylindrical end portions and provided with journals adapted to support said rollers.

9. In combination, a plurality of rollers, each having a cylindrical body portion and rounded end portions, a tube having cylindrical end portions and a conical intermediate portion provided with perforations through which said rollers extend, and an annulus secured to one of said cylindrical end portions and provided with journals adapted to support said rollers.

10. In combination, a plurality of cylindrical rollers, a supporting frame comprising a tube having cylindrical end portions and a conical intermediate portion, an annulus surrounding one of said cylindrical end portions, an annulus within the other cylindrical end portion, and journals carried by said annuli for supporting said rollers.

11. In combination, a plurality of rollers, each having a cylindrical body portion and rounded end portions, a supporting frame comprising a tube having cylindrical end portions and a conical intermediate portion, an annulus surrounding one of said cylindrical end portions, an annulus within the other cylindrical end portion, and journals carried by said annuli for supporting said rollers.

12. In combination, a collar having a cylindrical bearing surface and a beveled shoulder, a boxing having an interior cylindrical bearing surface and a beveled shoulder oppositely-disposed to the first mentioned beveled shoulder, a plurality of rollers intermediate said collar and boxing and having rounded end portions contacting with said beveled shoulders, a supporting frame for said rollers, comprising a tube having cylindrical end portions and a conical intermediate portion, said intermediate portion being provided with perforations through which said rollers extend, an annulus surrounding one of said cylindrical end portions, a second annulus within the other cylindrical end portion, and journals carried by said annuli for supporting said rollers.

In testimony whereof I have signed my name to this specification in the presence of two subscribing witnesses.

ELLSWORTH J. EDWARDS.

Witnesses:
ELMER T. THOMPSON,
HENRY M. DOLE.